United States Patent
Ala-Luukko et al.

(10) Patent No.: US 8,351,899 B2
(45) Date of Patent: Jan. 8, 2013

(54) GENERATION OF CHARGING INFORMATION IN GROUP COMMUNICATIONS SYSTEM

(75) Inventors: Sami Ala-Luukko, Helsinki (FI); Tero Jalkanen, Tuusula (FI)

(73) Assignee: TeliaSonera AB, Stockholm (SE)

( * ) Notice: Subject to any disclaimer, the term of this patent is extended or adjusted under 35 U.S.C. 154(b) by 361 days.

(21) Appl. No.: 12/224,063

(22) PCT Filed: Feb. 15, 2007

(86) PCT No.: PCT/FI2007/050080
§ 371 (c)(1),
(2), (4) Date: Jan. 21, 2009

(87) PCT Pub. No.: WO2007/093675
PCT Pub. Date: Aug. 23, 2007

(65) Prior Publication Data
US 2009/0305662 A1    Dec. 10, 2009

(30) Foreign Application Priority Data
Feb. 17, 2006   (EP) .................................... 06110077

(51) Int. Cl.
*H04W 4/24* (2009.01)
*H04B 7/00* (2006.01)
(52) U.S. Cl. ................ 455/406; 455/518; 455/90.2
(58) Field of Classification Search .......... 455/405–409, 455/414.1, 518–521, 404.1–404.2, 90.1–90.3
See application file for complete search history.

(56) References Cited

U.S. PATENT DOCUMENTS

| | | | |
|---|---|---|---|
| 2002/0150091 A1* | 10/2002 | Lopponen et al. | 370/389 |
| 2004/0077333 A1 | 4/2004 | Koskinen et al. | |
| 2006/0052126 A1* | 3/2006 | Choksi | 455/518 |
| 2006/0063549 A1 | 3/2006 | Choksi | |

FOREIGN PATENT DOCUMENTS

| | | | |
|---|---|---|---|
| EP | 1713246 A1 | 10/2006 | |
| WO | WO 2005/025255 A1 | 3/2005 | |
| WO | WO 2005025255 A1 * | 3/2005 | |

OTHER PUBLICATIONS

OMA Specification "PoC Charging Functionality", Apr. 29, 2004, pp. 1-5.
OMA (Open Mobile Alliance) specification "*Push-to-talk over Cellular (PoC)—Architecture*", candidate version 1.0, Aug. 5, 2005, 167 pages (OMA-AD_PoC-V1_0-20050805-C).

(Continued)

*Primary Examiner* — Ajit Patel
*Assistant Examiner* — Erica Navar
(74) *Attorney, Agent, or Firm* — Cozen O'Connor

(57) ABSTRACT

The present invention relates to a method for collecting inter-operator charging information in a group communications system comprising a first group communications network element and a second group communications network element. An intermediate charging information collection unit is provided in an interface between the group communication network elements. The charging information collection unit examines a group communications message received from the first group communications network element or the second group communications network elements. A charging information unit is generated based on at least a portion of the message and the charging information unit is applied for inter-network charging to charge for use of inter-network resources.

13 Claims, 2 Drawing Sheets

OTHER PUBLICATIONS

The 3GPP specification 3GPP TS 32.272 "*Push-to-talk over Cellular (PoC) charging (Release 6)*", V6.2.0, Dec. 2005.

3GPP specification TS 23.228, "*IP Multimedia Subsystem; Stage 2 (Release 7)*", version 7.1.0, Sep. 2005.

3GPP report 3GPP TR 23.979, v. 6.2.0, "Push-to-talk over Cellular (PoC) services; Stage 2 (Release 6)", Jun. 2005.

OMA specification "PoC User Plane, Candidate Version 1.0—Nov. 4, 2005".

* cited by examiner

GENERATION OF CHARGING INFORMATION IN GROUP COMMUNICATIONS SYSTEM

PRIORITY CLAIM

This is a U.S. national stage of application No. PCT/FI2007/050080, filed on 15 Feb. 2007. Priority is claimed on the following application: Country: EP, Application No.: 06110077.2, Filed: 17 Feb. 2006, the content of which is incorporated here by reference.

FIELD OF THE INVENTION

The present invention relates to generation of charging information in a group communications system.

BACKGROUND OF THE INVENTION

One special feature offered in mobile communications systems is group communication. Conventionally group communication has been available only in trunked mobile communications systems, such as Professional Radio or Private Mobile Radio (PMR) systems, such as TETRA (Terrestrial Trunked Radio), which are special radio systems primarily intended for professional and governmental users. Group communication is also becoming available in public mobile communications systems. New packet-based group voice and data services are being developed for cellular networks, especially in GSM/GPRS/3G network evolution, wherein the approach is based on the idea of a group communication service being provided as a packet-based user or application level service so that the underlying cellular network only provides the basic connections (i.e. IP connections) between the group communications applications in user terminals and the group communication service. When this approach is employed in push-to-talk communication, the concept is also referred to as a push-to-talk over cellular (PoC) network.

Generally, in group voice communication with a "push-to-talk, release-to-listen" feature, a group call is based on the use of a pressel (PTT, push-to-talk switch) in a telephone as a switch: by pressing a PTT the user indicates his or her desire to speak, and the user equipment sends a service request to the network. The network either rejects the request or allocates the requested resources on the basis of predetermined criteria, such as the availability of resources and priority of the requesting user. At the same time, a connection is also established to all other active users in the specific subscriber group. After the voice connection has been established, the requesting user may talk and the other users may listen on the channel. When the user releases the PTT, the user equipment signals a release message to the network, and the resources are released. Thus, the resources are reserved only for the actual speech transaction or speech item, instead of reserving the resources for a "call".

The IMS (IP multimedia subsystem) charging architecture is used for charging of PoC services. The architecture comprises a Charging Collection Function (CCF) for offline charging and an Online Charging System for online charging PoC service-related events, where these entities are connected to a PoC server. The PoC server, performing either a participating PoC function (for a participant of a PoC session) or a controlling PoC function (for a PoC session owner), prepares charging information for the offline and online charging entities. Charging for PoC services is also illustrated in OMA (Open Mobile Alliance) specification "Push-to-talk over Cellular (PoC)-Architecture", candidate version 1.0, 05 Aug. 2005, 167 pages (OMA-AD_PoC-V1_0-20050805-C). The 3GPP specification 3GPP TS 32.272 "Push-to-talk over Cellular (PoC) charging (Release 6)", V6.2.0, December 2005, describes in more detail charging functions that may be carried out in the PoC system. The charging functionality for charging PoC subscribers for use of PoC services is described in these documents. However, besides operator-subscriber charging, there is a need to collect inter-operator charging information to charge for use of inter-operator data transmission resources provided for other operators or service providers, for instance for charging a home network operator for an inter-network connection provided for transferring information to/from a roaming PoC subscriber in a visited network. Such inter-operator charging has been based on the amount of transferred data.

BRIEF DESCRIPTION OF THE INVENTION

A method and an apparatus facilitating enhanced inter-network charging are now provided. Various aspects of the invention include a method, a communications device, and a system, which are characterized by what is stated in the independent claims. Various embodiments of the invention are disclosed in the dependent claims.

The present invention is related to collecting inter-operator charging information in a group communications system for distributing data or speech packets to mobile stations according to their group memberships, the system comprising a first group communications network element and a second group communications network element. According to an aspect of the invention, an intermediate charging information collection unit is provided in an interface between the group communication network elements. The charging information collection unit examines a group communications message received from the first group communications network element or the second group communications network element. A charging information unit for inter-operator charging to charge for inter-network resources is generated based on at least a portion of the message and the charging information unit is applied for inter-operator charging.

The charging information collection unit refers generally to a device, a module in a device or functionality in a device for providing the above-mentioned technical features. It is to be noted that the term "charging" is to be understood broadly to cover features related to charging or billing for communications services, and may also refer to "accounting" used in some instances. Further, the term "charging information unit" is to be understood broadly to refer to an information unit comprising information appropriate for inter-operator charging purposes. Such a unit could be a complete charging data record or a unit comprising information collected from and/or defined on the basis of one or more predetermined headers in the message. The term "inter-operator charging" refers generally to charging between two entities in separate networks, for instance between network operators or service providers.

According to an embodiment, the charging information unit is transmitted for inter-operator charging to a charging system of the first group communications network element and/or the second group communications network element.

According to another embodiment, the charging information collection unit is arranged to examine messages between at least two PoC servers, the first group communications network element and the second system portion being PoC servers. The charging information collection unit is arranged to generate the charging information unit on the basis of a PoC control protocol message.

The invention and its embodiments provide various advantages. It is possible to generate charging information on the basis of group communications messages between group communications networks for inter-operator charging purposes, and in particular to enable charging for use of inter-operator connection resources. The charging information may be generated based on group communications messages that are nevertheless transferred to enable group communications between entities in different networks. Further, changes are not needed to the existing group communications devices, for instance to PoC servers. An operator or group communications service provider does not have to implement inter-network charging information collection in its network, but may outsource these activities to a third party operating the intermediate charging information collection unit. Another substantial advantage is that different charging models can be applied to inter-network charging. Since various information is available from the communications messages, the intermediate charging information collection unit may be arranged to support different charging models. Thus, more versatile charging is available as compared to the conventional inter-operator charging based on the amount of transferred data between networks.

BRIEF DESCRIPTION OF THE DRAWINGS

In the following, the invention will be described in greater detail by means of preferred embodiments and with reference to the attached drawings, in which.

DETAILED DESCRIPTION OF THE INVENTION

The present invention is applicable to arranging charging information generation between group communications networks, such as between PMR (Private Mobile Radio) or LMR (Land Mobile Radio) networks and/or PoC networks. The invention is applicable in systems in which communication is arranged via a circuit-switched and/or packet-switched connection. Some embodiments disclosed below are depicted using PoC service related messages carried between GPRS packet radio service based networks as examples, without limiting the invention solely to these systems. Furthermore, Voice over IP (VoIP) is mentioned only as an example of IP-based communication methods applicable to the system.

Figure 1:
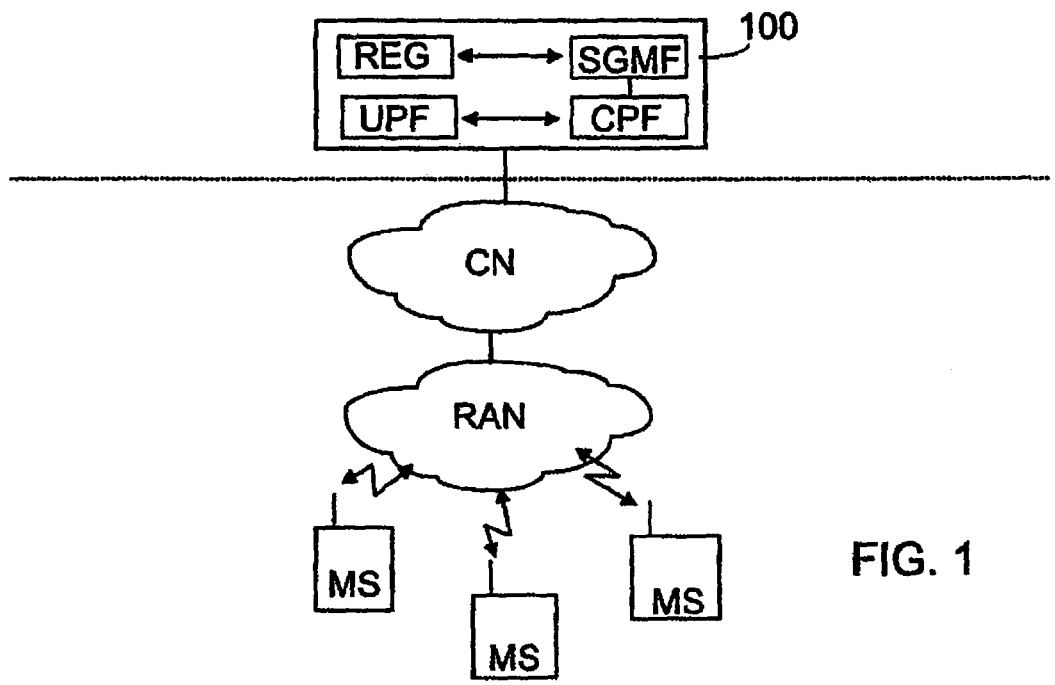
FIG. 1 illustrates a general concept of a PoC network arrangement.

FIG. 1 illustrates a general concept of a PoC network arrangement. In FIG. 1, a packet based group communication system 100 having separated control-plane functions CPF and user-plane functions UPF is provided on top of the mobile network. The mobile network below comprises a core network CN and a radio access network RAN for offering a radio connection for the mobile stations MS. The cellular network may be based on any second or third or further generation mobile network, such as a GSM/GPRS network or a UMTS (3GPP) network. The radio access network RAN can also be implemented as a wireless local area network WLAN. The type and structure of the wireless network beneath the PoC network arrangement are, however, irrelevant to the implementation of the PoC service, as far as a packet data connection is available for the wireless network via the wireless network. Thus, any packet-switched wireless network can be used as a bearer service for the PoC service.

The group communication system 100 may be embodied as a server system comprising one or more servers. Subscriber communication directed to the server system is typically routed via a proxy, since the PoC service does not usually enable peer-to-peer communication between terminals and server(s). Conceptually, the group communication server system may comprise control-plane functions CPF and user-plane functions UPF providing packet mode server applications which communicate with the group communication client application(s) in the mobile stations MS over the IP connections provided by the communication system. This communication includes signalling packets and voice or data communication packets.

The user-plane function(s) UPF is responsible for distributing data or speech packets to the mobile stations MS according to their group memberships and other settings. The UPF forwards traffic only between valid connections programmed by the CPF. In the case of speech communication, it may be based on a voice over IP (VoIP) protocol, and/or a Real-time Transport Protocol (RTP). The basic user-plane operation typically includes that all the data or speech packet traffic from a sending user is routed to the UPF, which then delivers the packet traffic to all receiving users in the group, using a suitable technique, such as multicasting or multiple unicasting (multi-unicast).

The CPF function is responsible for control-plane management of the group communication. This may include, for example, managing user activity and creation and deletion of logical user-plane connections with an appropriate control protocol, such as Session Initiation Protocol SIP. The user may also perform group attachment and group detachment with the CPF using control signalling, for instance the SIP protocol. The CPF also carries out user registration and authentication.

The group communication server system 100 may also include a subscriber and group management function (SGMF) for managing subscriber and group data. It may also provide specific tools and interfaces needed for subscriber and group provisioning. The system 100 may also include a register REG for storing all provisioned data in the group communication system. The group communication server system 100 may further include a presence service (PresS) functionality, which may be provided on the infrastructure side by means of a presence server PS. The mobile stations MS, in turn, thus comprise presence client applications. The presence information on the user's device may be delivered to other user devices within a communication group.

Figure 2:
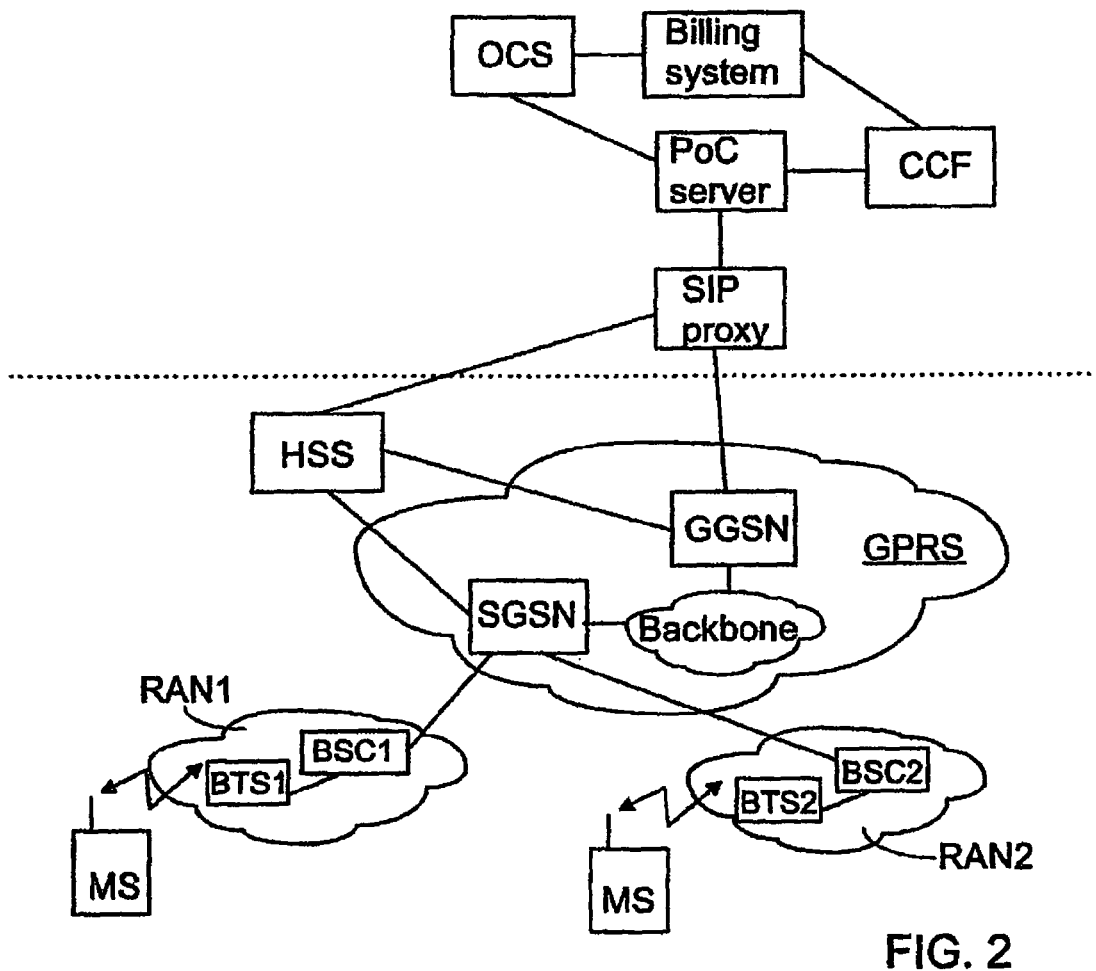
FIG. 2 illustrates PoC network functions in more detail in connection with a GSM/GPRS network.

FIG. 2 shows only some of the network elements of a GSM/GPRS network underlying the PoC system elements. GSM/GPRS networks comprise a great number of other network elements as well, but the appreciation of the invention does not require these elements to be disclosed herein.

Base station controllers BSC1/2, connected to base stations BTS1/2, are also connected both to a circuit-switched (CS) GSM core network and to a packet-switched (PS) GPRS network, only the latter being disclosed herein in more detail. For a packet-switched connection, the BSC is further coupled to a Packet Control Unit (PCU). The PCU is coupled to a Serving GPRS Support Node (SGSN) via a Gb interface for providing a bearer path and a signalling interface between the PCU and the SGSN.

In addition to the serving nodes SGSN, the GPRS packet radio system can comprise several gateway nodes GGSN (Gateway GPRS Support Node). Typically several serving nodes SGSN are connected to one gateway node GGSN. Both nodes SGSN and GGSN function as routers supporting the mobility of a mobile station, which routers control the mobile system and route data packets to mobile stations regardless of their location and the protocol used. Subscriber-specific information is stored in a home subscriber server HSS. The gateway node GGSN acts as a gateway between the GPRS packet radio system and an external data network PDN (Packet Data Network). External data networks include the UMTS or GPRS network of another network operator, the Internet, an X.25 network or a private local area network. The GGSN can also be connected directly to a private company network or to a host, like the PoC communication server system via a SIP proxy, as depicted in FIG. 2.

Accordingly, the GSM/GPRS network in FIG. 2, known as such, provides an IP-based communication infrastructure, on top of which the PoC service is implemented as data transfer between the PoC group communication server system and PoC client applications residing in the mobile stations MS, and between PoC group communication servers in different networks. The GGSN is connected to the PoC group communication server system via the SIP proxy, whereby the SIP proxy routes the VoIP packets between the mobile stations MS and the PoC group communication server system. It is to be noted that the IMS entities are not illustrated in detail in FIG. 2. For more details on IMS entities, such as CSCFs (Call State Control Function) communicating with the PoC group communication server system, a reference is made to 3GPP specification TS 23.228, "IP Multimedia Subsystem; Stage 2 (Release 7)", version 7.1.0, September 2005; for instance FIG. 4.

A Charging Collection Function (CCF) attains to offline charging (via Rf interface to the PoC server) and an Online Charging System (OCS) attains to online charging (via Ro interface to the PoC server) for PoC subscribers of PoC service related events, both of these entities are further connected to the billing system of an operator. The PoC server may be connected to a remote PoC system and a remote PoC server via PoC-4 interface, also referred to as the NNI. User media data and control (talk burst control) messages may be transferred (by RTP and RTCP, respectively) over this interface between the PoC systems.

For more details on the PoC architecture and services, reference is made to the 3GPP report 3GPP TR 23.979, v. 6.2.0, "Push-to-talk over Cellular (PoC) services; Stage 2 (Release 6)", June 2005, and to the OMA specification "Push to talk over Cellular (PoC)-Architecture, Candidate Version 1.0-5 Aug. 2005", 167 pages.

According to an embodiment of the invention, to facilitate inter-operator charging for use of inter-network resources, an intermediate charging information collection unit is provided in an inter-network (which may also imply inter-operator, inter-service provider, or inter-system in the context of the present application) interface, i.e. may be connected to a line between networks of different service providers or network operators, for instance.

The intermediate charging information collection unit is in one embodiment arranged to intercept communications between group communication servers, i.e. in the logical interface between the group communication servers, and arranged to generate charging information on the basis of selected portions of such communications. The intermediate charging information collection unit may be arranged to check one or more predetermined header fields of messages according to the protocol(s) applied in the communication between the group communication servers.

In one embodiment, the intermediate charging information collection unit is arranged to define charging information on the basis of voice group communications control protocol messages. In the following, an embodiment is illustrated in which the intermediate charging information unit is a proxy device comprising means to connect to an interface between PoC networks and PoC servers, but it is to be noted that one or more of the features below may also be applied in other types of intermediating devices.

Figure 3A:
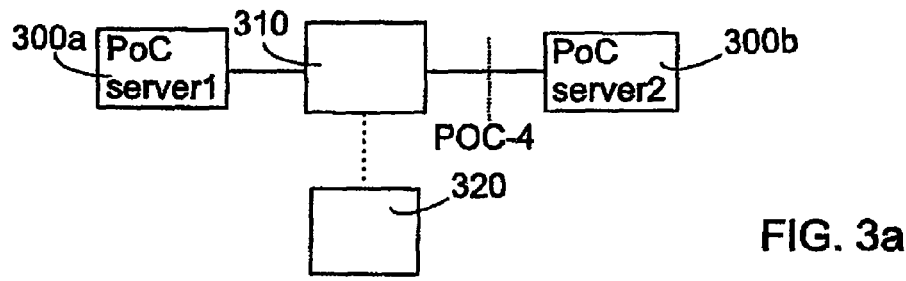
FIG. 3a illustrates inter-network interface in a PoC system according to an embodiment of the invention.

FIG. 3a illustrates a PoC architecture level PoC-4 interface between PoC servers 300a, 300b according to an embodiment, wherein a proxy 310 capable of examining PoC communications is provided. The proxy 310 may be provided in a routing area facilitating inter-network communications between networks, such as networks of different PLMN operators or PoC service providers. The proxy 310 is arranged to form charging information for inter-operator charging on the basis of the PoC communications, i.e. generate charging information units or charging data records (CDR) on the basis of messages received from one or more PoC servers 300a, 300b. It is to be noted that the message contents being analyzed for charging information generation purposes may be originating from the PoC server 300a, 300b, or some other entity in the service provider's environment.

According to an embodiment, the proxy 310 is arranged to analyze one or more message header fields originating from a PoC client in a mobile terminal and/or originating from a participating or a controlling PoC server. The proxy 310 may be arranged to analyze and generate charging information on user plane and/or control messages.

Figure 3B:
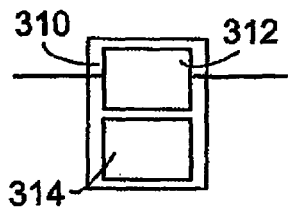
FIG. 3b illustrates an intermediate charging collection unit according to an embodiment of the invention.

FIG. 3b illustrates basic modules in the proxy 310. The module 312 represents a communications module for connecting to an inter-operator interface and for receiving and analyzing messages from a PoC server 300a, 300b. This module may also transmit the messages forward. The communications module 312 may provide a protocol stack for implementing communications with the PoC server 300a, 300b and lower layer network elements. The module 312 supports one or more group communications protocols and under-lying network specific protocol stack to receive, analyze and transmit group communications messages. The reference 320 represents a charging information generation module to generate charging information units on the basis of messages in the PoC server interface.

Computer program codes stored on a memory medium and executed in a processing unit of a device providing the proxy 310 may be used for causing the proxy device to implement means for providing inventive functions relating to arranging inter-network charging information collection, some embodiments of the inventive functions being illustrated further below. Hardware solutions or a combination of hardware and software solutions may also be used to implement the inventive functions. It should be appreciated that the blocks illustrated in FIG. 3b are functional blocks that can be implemented in a variety of different circuit configurations. For example, the functions of the communications module 312 may be distributed among a plurality of hardware and/or software units. Further, the modules illustrated in FIG. 3b and more specific features illustrated below may be applied to generating inter-operator charging information between any group communications servers.

Figure 4:
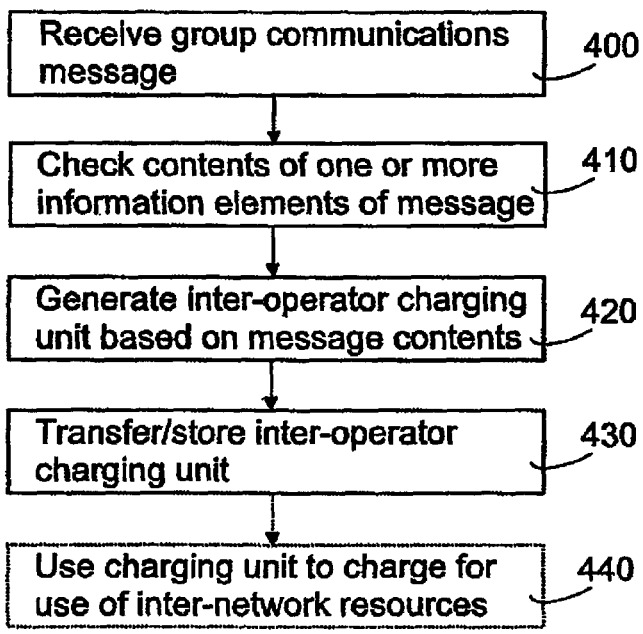
FIG. 4 illustrates a method according to an embodiment of the invention.

FIG. 4 illustrates basic operations that may be carried out in the proxy 310. In step 400, a group communications message is received in the PoC server interface, i.e. the POC-4 interface. The proxy 310 may be arranged to intercept and examine only specific packets requiring inter-network charging. For instance, one or more packet header properties may be predetermined as triggering initiation of the procedure in FIG. 4 for a received packet. As a further example, the proxy 310 may be arranged to detect certain PoC group communications packets, or some of such packets, meeting the criterion for inter-operator charging data generation, and initiate the procedure in step 410.

The proxy 310 is pre-configured with one or more information elements, which are to be checked from a received group communications message for inter-network charging purposes. In step 410, one or more information elements in the received message are checked for inter-network charging information generation purposes. Thus contents of one or more specific protocol header fields may be checked. The message may then be forwarded to a destination network and a PoC server. It is to be noted that the proxy 310 may be configured to perform further processing related to the message before transmitting the message contents further.

In step 420, one or more inter-operator charging information units (CIU) are generated on the basis of the contents of the received message. This operation may include inclusion of an identifier obtained from the message and/or creation or derivation of information for the CIU based on the message contents. Some information of the CIU may completely originate from the proxy 310. The CIU may be a complete message in conformance with a specific format agreed as an information exchange format between the service providers' inter-operator charging systems.

In step 430, the generated charging information unit is transferred to another entity for charging purposes. For instance, the proxy 310 may transfer the CIU to a charging system element of the operator controlling the proxy 310, or to an inter-operator charging or accounting system, which may reside in a network of another service provider. Another example is that the CIU is simply stored in a charging information storage for bill generation purposes, for instance. The transmission of the CIU may utilize already applied charging information exchange features and protocols between charging information systems. As illustrated in step 440, inter-operator charging to charge for use of inter-network resources is arranged by using the CIU. This step is charging system specific and may involve generation of a bill to a charged network operator on the basis of accumulated CIUs, for instance. It is to be noted that step 440 is marked by a dashed line to illustrate that in the present embodiment this step is provided by one or more other network elements.

In one embodiment, messages of the TBCP (Talk Burst Control Protocol) specified by the OMA are applied as a basis for charging information generation. The TBCP is applied to provide floor control within the PoC environment. In this embodiment, the proxy 310 and the communications module 312 may be arranged to analyze one or more header fields of a received TBCP message. The communications module 312 of the proxy 310 comprises a protocol stack to receive, analyze and transmit TBCP messages: The TBCP messages are transferred as RTCP APP packets, the RTCP (Real Time Control Protocol) being specified in IETF RFC 3550. A UDP/IP (User Datagram Protocol/Internet Protocol) stack is applied to support transfer of RTCP messages. In one embodiment. the proxy 310 and the communications module 312 are capable of analyzing one more fields of TBCP messages. For more details on the current TBCP features and message contents, a reference is made to the OMA specification "PoC User Plane, Candidate Version 1.0-4 Nov. 2005". The TBCP message contents are specified in Chapter 6.5. Some further implementation examples of the embodiment of applying TBCP messages for charging information generation in the proxy 310 are illustrated in the following.

In a first example, the proxy 312 is arranged to form charging information on the basis of one or more following TBCP messages: Talk Burst Request, Talk Burst Confirm or Talk Burst Granted, Talk Burst Deny, Talk Burst Taken, Talk Burst Release, Talk Burst Complete, Stop Talk Burst. As an example, the proxy 312 may be arranged to specify a charging unit for charging the subscriber when a TBCP Talk Burst Request is received from a POC terminal (MS) associated with the subscriber. Hence each access attempt on the basis of pushing the tangent in the terminal may be charged. In another example, the subscriber is charged always when the associated terminal is given floor in the PoC session on the basis of the Talk Burst Confirm message. A still further example is that charging information is generated on the basis of detected Release messages.

In one embodiment, the intermediate charging information collection unit is arranged to detect (in step 410) at least one identifier of a group communications session and include this identifier in the charging information. In the present PoC embodiment, each PoC terminal user or subscriber is represented by one or more identifiers on the basis of which the proxy 310 may be arranged to directly or indirectly identify a charged entity. In a further embodiment, the proxy 310 may be arranged to check a PoC user or client identifier in the received message and include the PoC identifier in the charging Information unit. As a further example, the Synchronization Source (SSRC) identifier as defined in the IETF RFC 3550 and identifying a source of the stream of RTP packets may be applied. The proxy 310 may thus be arranged to check an SSRC from a received TBCP message and include the SSRC as an identifier in the charging information unit. However, it is to be noted that also other PoC specific or non-specific identifiers may be checked or defined by the proxy 310 and included in the charging information unit. For instance, an IMSI, a MSISDN, or another PoC system specific identifier (for instance a PoC session or group identifier) may be applied.

In one embodiment, the proxy 310 is arranged to check an identifier of a PoC server (300a and/or 300b) and generate charging information on the basis of this identifier. In a further embodiment, the proxy 310 may be arranged to check a destination and/or source IP address of the received packet to define the PoC server. Hence, the proxy 310 in general may be arranged to check information on different protocol headers in step 410 to gather information necessary for generating and transmitting the charging information unit. On the basis of this information, it is possible to separate different operators or service providers and address the generated charging information unit to an appropriate entity. The PoC server Identifier may be included in the charging information unit. Further, the destination of the charging information unit may be determined on the basis of the PoC server identifier. Hence, the charging information collection in the intermediate collection unit or the proxy 310 may be based on various levels or entities of the system architecture. In one embodiment, the charging information collection is IP level based, whereby the charging information collection and also determination may be arranged based on the PoC server domain information or IP address. In another embodiment, the charging is "PoC level" based such that user's or group's PoC addresses are applied. Thus, it is possible to specify the elaborateness of inter-operator charging information to a desired level.

It is to be noted that the above illustrated protocols and information types are merely examples of possible sources for charging information generation, and the intermediate charging information collection unit, such as the proxy 310, may be arranged to apply any combination of the mentioned embodiments and also other protocols and information elements.

Since different information is available from the communications messages, the proxy 310 and the overall inter-network charging system may be arranged to support different inter-operator charging models. The proxy 310 may be provided with various configurations or charging objects determining which information to define from the received messages and how to form the charging information unit. An entity in a charging or accounting system may then further process the charging information unit and generate a chargeable entry or record to be billed, or change credit, for instance. As an example of an applicable advanced charging model for inter-network charging, the proxy 310 may be arranged to collect information for determining the duration of speech bursts from PoC messages. The charge may then be formed dependent on the duration of a speech burst. Further, different prices may be associated with speech bursts of different durations. For instance, the price for speech bursts having a duration between 5 to 10 seconds could be 10 cents.

Since various embodiments of the present invention enable many different charging models and charging information types, each operator or another entity utilizing the proxy 310 may agree with a possible proxy service provider the terms and format of inter-operator charging data units from the proxy 310. The proxy 310 may then be configured accordingly. The hardware and software of the proxy 310 may be equipped and configured to support various interfaces to other systems in order to send charging information. Such interfaces may be operator-specific and need not be discussed in detail here. Hence the proxy 310 may be arranged to support various inter-operator specific requirements, protocols and information formats. As further regards the format of the charging information units or CDRs generated by the proxy 310, various already applied or future storage and message formats for exchanging charging information may be applied in the charging system and in the proxy 310. For instance, human-readable formats may be applied. In one embodiment, an XML-based (Extensible Mark-up Language) based format is applied.

In one embodiment, mediators, which may be specific devices within the charging system, may be applied to processing the inter-operator charging data units or records from the proxy 310. The proxy 310 is configured to transmit at least some information for charging purposes to such a mediator which is configured to receive such information and process and/or deliver it further. It is to be noted that such a mediator may also process information for charging from other sources in the telecommunications system. In a further embodiment, one or more mediators process the information collected by the proxy 310. Thus, such a mediator may carry out at least some features illustrated above in connection with step 430 of FIG. 4 and produce charging information units or actual bills. For instance, such a mediator may process data from the proxy 310 indicating the number of burst transferred. The proxy 310 may be configured to communicate with already applied mediator devices.

In one embodiment, the proxy 310 is operated as a "broker" within the telecommunications system. A service provider or an operator of the proxy 310 may provide complete inter-operator charging services, for instance such that a network operator is provided with a complete bill at certain time periods for all inter-operator (group) communications. In another example, the network operator itself has charging information generation facilities producing charging information which may added to or processed with the received inter-operator charging information originating from the proxy 310. For instance, comparison of charging information may thus be arranged.

In one embodiment, the proxy 310 comprises a configuration interface for managing settings or charging objects related to present charging features. By this configuration management interface settings may be added, changed, or removed. For instance, at least some of the above-illustrated charging related identifiers to be checked and included in the inter-operator charging information units may be configurable. In a further embodiment, there may be multiple configurations in the proxy 310, and each configuration may be separately managed by a management application. In a further embodiment, the configuration interface provides remote management, i.e. settings may be managed by a remote device connected to the proxy 310.

Figure 5:
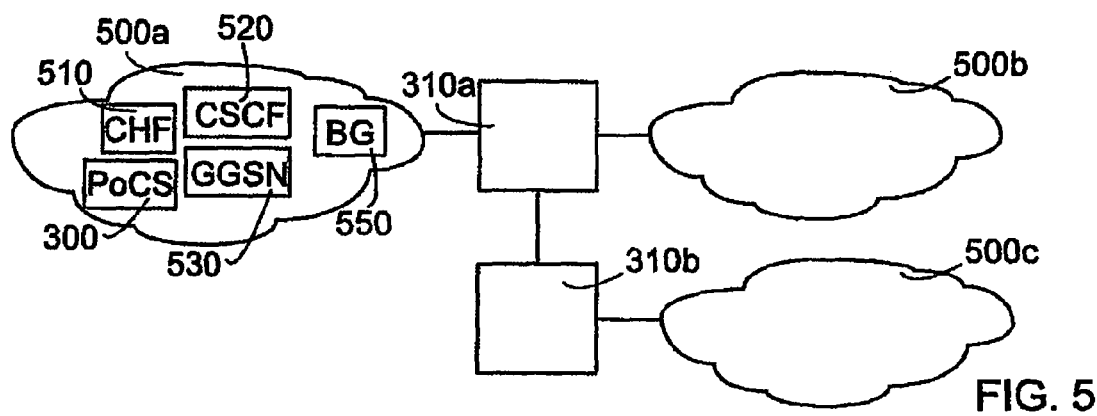
FIG. 5 illustrates exemplary network architectures according to some embodiments of the invention.

FIG. 5 illustrates some exemplary network architectures for applying the intermediate charging information collection unit. The intermediate charging information collection unit, in the example of FIG. 5 the proxy device 310a, may provide inter-operator charging information generation between two network systems 500a and 500b. The proxy device 310a-c may be located in the routing domain of the respective network system 500a-c and function as a SIP proxy with additional functionality as illustrated above. Besides the above illustrated charging information generation related functionality, the proxy device 310a-c may provide other inter-network related tasks, such as interworking functions (for instance transcoding and protocol conversion), various routing related features, security features, and quality of service maintenance.

The proxy device 310a may also be arranged to communicate with another proxy device 310b in order to generate and/or exchange charging information. Some network elements of a PoC capable 3GPP network are also illustrated in FIG. 5: A border gateway 550 provides communication between the core network of the system 500a and the proxy device 310a, and may deliver user plane messages to and from a GGSN 530 and control plane messages to and from CSCF(s) 520. The PoC server 300 may transmit and receive PoC media and control messages to and from the CSCF 520. A charging functionality CHF 510 may be arranged to handle inter-network charging information from at least one proxy device 310a. It is to be noted that the charging functionality 510 or a device providing the inter-network charging may also reside outside the mobile network 500a. For instance, an external service provider and a charging data collection device may be collecting charging data from proxy devices 310a-c.

Referring to FIG. 5, one basic scenario in which the above illustrated charging information features may be applied, is that group communications session participants, for instance an originating PoC client and a terminating PoC client, are located in separate networks (for instance 500a and 500b), whereby PoC messages are transferred between these networks 500a, 500b. Depending on the desired charging model, an operator or service provider of the originating and/or terminating side, may be charged for inter-network PoC messages.

Another exemplary scenario is that charging information units are generated for charging a first operator or service provider controlling a first group communications server (for instance 310a) on usage of network resources provided by a second operator or service provider, and in particular the group communications server interface, i.e. in the PoC system the POC-4 interface, resources, controlling a second group communications server (310b) on the basis of a group communications message associated with a mobile station with PoC client visiting a network 500b of the second operator or service provider. Hence, inter-network charging information may be generated for roaming mobile stations involved in group communications in various ways.

The above illustrated features related to forming inter-network charging information may be applied to various media types. Besides voice communications, the proxy 310 may be arranged to form charging information on the basis of messages in the network interface comprising other media types, for instance multimedia data. Thus, the proxy 310 may be adapted to support any further developments of the PoC and other group communications technologies, for instance "push-to-x" in which the current principles of "push-to-talk" can be applied to instantly transfer video to other group participants, for instance.

It will be obvious to a person skilled in the art that as technology advances, the inventive concept can be implemented in various ways. The invention and its embodiments are not limited to the examples described above but may vary within the scope of the claims. Hence, features may be combined in various ways, omitted, modified or replaced by equivalents.

The invention claimed is:

1. A method for collecting inter-operator charging information in a group communications system for distributing data or speech packets to mobile stations according to their group memberships, the communications system comprising a first group communications server, a second group communications server and an intermediate charging information collection unit, separate from the first and second group communication servers, provided in an interface between the first and second group communication servers, the group communication servers functioning as push-to-talk over cellular servers, the method comprising:
examining, in the charging information collection unit, a group communications message facilitating group communications between group communications participants located in separate networks, transferred over the interface between group communication systems and received from the first group communications server or the second group communications server;
generating a charging information unit for inter-operator charging to charge for inter-network resources based on at least a portion of the message;
arranging inter-operator charging to charge for inter-network resources using the charging information unit; and
transmitting the charging information unit for inter-operator charging to an inter-operator charging system of the first group communications server and the second group communications server.

2. The method according to claim 1, wherein the charging information unit is generated based on a voice group communications control protocol message.

3. The method according to claim 1, wherein the intermediate charging information collection unit is provided with an Internet Protocol IP exchange proxy intermediating Session Initiation Protocol (SIP) communications in a routing domain of a first system portion comprising the first group communications server or a second system portion comprising the second group communications server.

4. A communications device for a group communication system for distributing data or speech packets to mobile stations according to their group memberships, the communications device comprising:
a communications module for receiving data messages and examining the received data messages;
wherein the communications device is configured to examine a group communications message facilitating group communications between group communications participants located in separate networks, transferred over an interface between group communication systems and between a first group communications server and a second group communications server, the group communication servers functioning as push-to-talk over cellular servers, and the communications device being separate from the first and second group communication servers and being provided in the interface;
wherein the communications device comprises a charging information generation module to generate, based on at least a portion of the message, a charging information unit for inter-operator charging of inter-network resources; and
wherein the communications device is configured to transmit the charging information unit for inter-operator charging to an inter-operator charging system of the first group communications server and the second group communications server for the inter-operator charging of inter-network resources.

5. The communications device according to claim 4, wherein the communications device is further configured to check at least one predetermined header field in the group communications message, and wherein the communications device is further configured to generate the charging information unit based on the at least one predetermined header field.

6. The communications device according to claim 4, wherein the communications device is further configured to generate the charging information unit based on a PoC control protocol message.

7. The communications device according to claim 4, wherein the communications device is configured to generate the charging information unit based on media transmission permission control protocol messages of the group communications system.

8. The communications device according to claim 4, wherein the communications device is further configured to check at least one of an identifier specified for a group communications client and an identifier of a group communications server in the group communications message, and wherein the device is further configured to include the identifier in the charging information unit.

9. The communications device according to claim 8, wherein the identifier is a Synchronization Source identifier specifying a source of a stream of Real Time Protocol (RTP) packets.

10. The communications device according to claim 4, wherein the communications device further comprises a communications module to receive and examine group communications messages from the interface between the group communication servers and a charging information generation unit to generate the charging information unit from at least a portion of the group communications message.

11. The communications device according to claim 4, wherein the communications device is further configured to generate charging information units to charge for use of inter-network resources provided by a second operator or service provider controlling the second group communications server based on the group communications message associated with a mobile group communications device visiting a network of the second operator or service provider.

12. The communications device according to claim 4, wherein the communication device is an Internet Protocol IP exchange proxy configured to intermediate Session Initiation Protocol SIP communications in a routing domain of a first system portion comprising the first group communications server or a second system portion comprising the second group communications server.

13. A communications system configured to generate inter-network charging information for a group communications system for distributing data or speech packets to mobile stations according to their group memberships, the communications system comprising:

an intermediate charging information collection unit to examine a group communications message facilitating group communications between group communications participants located in separate networks transferred over an interface between group communication systems and between a first group communications server and a second group communications server, the group communication servers functioning as push-to-talk over cellular servers, and the intermediate charging information collection unit being separate from the group communication servers and provided in the interface;

wherein the communications system is further configured to generate a charging information unit based on at least a portion of the message;

wherein the communications system is further configured to arrange inter-operator charging to charge for inter-network resources using the charging information unit; and wherein the communications system is further configured to transmit the charging information unit for inter-operator charging to an inter-operator charging system of the first group communications server and the second group communications server.

* * * * *